United States Patent
Schaefer

(10) Patent No.: US 10,975,241 B2
(45) Date of Patent: Apr. 13, 2021

(54) POLYMER COMPOSITIONS COMPRISING SILOXANE-ORGANO-COPOLYMERS

(71) Applicant: WACKER CHEMIE AG, Munich (DE)

(72) Inventor: Oliver Schaefer, Burghausen (DE)

(73) Assignee: Wacker Chemie AG, Munich (DE)

( * ) Notice: Subject to any disclaimer, the term of this patent is extended or adjusted under 35 U.S.C. 154(b) by 53 days.

(21) Appl. No.: 16/340,166

(22) PCT Filed: Oct. 7, 2016

(86) PCT No.: PCT/EP2016/074073
§ 371 (c)(1),
(2) Date: Apr. 8, 2019

(87) PCT Pub. No.: WO2018/065072
PCT Pub. Date: Apr. 12, 2018

(65) Prior Publication Data
US 2019/0225802 A1    Jul. 25, 2019

(51) Int. Cl.
*C08L 83/10* (2006.01)
*C08L 77/02* (2006.01)
*C08J 3/00* (2006.01)
*C08G 77/54* (2006.01)
*C08G 77/458* (2006.01)
*C08G 77/455* (2006.01)
*C08L 83/14* (2006.01)

(52) U.S. Cl.
CPC ............. *C08L 77/02* (2013.01); *C08J 3/005* (2013.01); *C08L 83/10* (2013.01); *C08G 77/455* (2013.01); *C08G 77/458* (2013.01); *C08G 77/54* (2013.01); *C08J 2377/02* (2013.01); *C08J 2483/10* (2013.01); *C08L 83/14* (2013.01)

(58) Field of Classification Search
CPC ....... C08L 83/10; C08G 77/00; C08G 77/455; C08G 77/26; C08G 77/16; C08G 77/28; C08G 18/06
See application file for complete search history.

(56) References Cited

U.S. PATENT DOCUMENTS

| | | |
|---|---|---|
| 411,575 A | 9/1889 | Brock |
| 4,195,015 A | 3/1980 | Deleens et al. |
| 4,230,838 A | 10/1980 | Foy et al. |
| 4,331,786 A | 5/1982 | Foy et al. |
| 4,332,920 A | 6/1982 | Foy et al. |
| 4,483,975 A | 11/1984 | Jong et al. |
| 4,839,441 A | 6/1989 | Cuzin et al. |
| 4,864,014 A | 9/1989 | Cuzin et al. |
| 5,459,230 A | 10/1995 | Jong et al. |
| 5,605,978 A | 2/1997 | Maresca et al. |
| 6,007,914 A * | 12/1999 | Joseph ............... D01F 6/72 428/383 |
| 6,916,517 B2 | 7/2005 | Montanari et al. |
| 2001/0037008 A1 | 11/2001 | Sherman et al. |
| 2002/0179888 A1 | 12/2002 | Montanari et al. |
| 2004/0210024 A1 | 10/2004 | Schaefer et al. |
| 2015/0183990 A1 | 7/2015 | Dillon et al. |

FOREIGN PATENT DOCUMENTS

| | | |
|---|---|---|
| DE | 3709238 A1 | 5/1988 |
| DE | 3730504 C1 | 3/1989 |
| DE | 69110279 T2 | 11/1995 |
| DE | 10137855 A1 | 2/2003 |
| EP | 0250248 B1 | 11/1997 |
| EP | 0822951 B1 | 9/2002 |
| KR | 100427675 B1 | 7/2004 |
| WO | 9115538 A1 | 10/1991 |

OTHER PUBLICATIONS

Ouhadi, T., Abdou-Sabet, S., Wussow, H., Ryan, L. M., Plummer, L., Baumann, F. E., Lohmar, J., Vermeire, H. F. and Malet, F. L. (2014). Thermoplastic Elastomers. In Ullmann's Encyclopedia of Industrial Chemistry, (Ed.)., Chapter 4-4.6: Thermoplastic Polyamide Elastomers.
Kiyotsukuri et al. in J. Polymer. Sci. A 25 (1987) 1591.

* cited by examiner

*Primary Examiner* — Kuo Liang Peng
(74) *Attorney, Agent, or Firm* — Brooks Kushman P.C.

(57) ABSTRACT

Polymer compositions containing a polyamide polymer and a high molecular weight organopolysiloxane copolymer containing amide, urethane, urea, or thiourea groups exhibit high tensile strength but are soft elastomeric thermoplastics.

8 Claims, No Drawings

POLYMER COMPOSITIONS COMPRISING SILOXANE-ORGANO-COPOLYMERS

CROSS REFERENCE TO RELATED APPLICATIONS

This application is the U.S. National Phase of PCT Appln. No. PCT/EP2016/074073 filed Oct. 7, 2016, the disclosure of which is incorporated in its entirety by reference herein.

BACKGROUND OF THE INVENTION

1. Field of the Invention

The invention relates to polymer compositions comprising siloxane-organic copolymers and also to organic polyamides, more particularly copolyamides, methods for producing them, and their use.

2. Description of the Related Art

Silicones possess excellent temperature, UV, and weathering stability. They retain their elastic qualities at relatively low temperatures and hence also have no tendency toward embrittlement. In addition, they possess specific water repellency and nonstick surface properties. Furthermore, silicones can be used to produce very flexible elastomers, whose uses include, frequently, medical applications.

Thermoplastic copolyamides, in contrast, exhibit in some cases excellent adhesion to a variety of surfaces and excellent mechanical properties such as tensile strengths and elongations at break. Further factors are a low density, high resistance to chemicals and solvents, very good low-temperature impact toughness, and the excellent temperature stability of these products, which is in some cases much higher than that of polyurethanes. A disadvantage of thermoplastic copolyamides, however, is the fact that producing relatively flexible types is technically difficult, because the resulting products rapidly become very sticky at low Shore A hardness.

There have been attempts to improve these two classes of material by simple blending. Mention may be made in this context of DE69110279T2, in which high molecular mass silicone copolymers were incorporated in relatively small amounts into thermoplastic polyamides, thereby altering the surface properties, such as, for example, contact angle and adhesion properties. No significant influence was observed on the mechanical properties such as, for example, modulus of elasticity, yield point or tensile strengths.

By introduction of silicones into polyamide structures as described by Kiyotsukuri et al. in J. Polymer. Sci. A 25 (1987) 1591, for example, silicone-containing copolyamides are obtained which likewise have thermoplastic qualities. The thermoplastic silicones which can be produced in this way do not, however, exhibit any substantial reduction in hardness, owing to the short silicone segments used.

SUMMARY OF THE INVENTION

A subject of the invention is polymer compositions comprising
(A) at least one polyamide polymer and
(B) at least one siloxane-organic copolymer having 50 to 3000 siloxane units per siloxane segment and at least one organic segment having at least one group selected from ester groups, amide groups, urethane groups, urea groups, and thiourea groups.

DETAILED DESCRIPTION OF THE PREFERRED EMBODIMENTS

The organic segments in the copolymers (B) are preferably segments comprising urea, urethane or amide groups; more preferably, the organic segments in the copolymers (B) are segments comprising urea groups or urethane groups.

The distribution of the siloxane segments and the organic segments in the copolymers (B) used in accordance with the invention may be random, e.g., statistical. Component (B) preferably comprises block or comb polymers, more preferably block copolymers.

Component (B) preferably comprises siloxane-organic copolymers of the general formula (1)

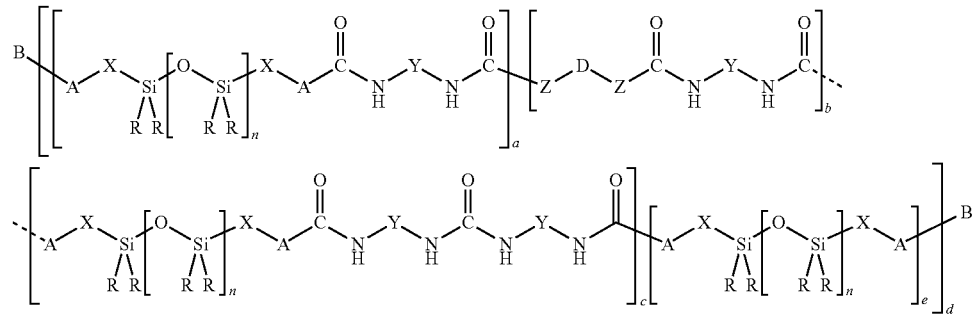

where
R may each be identical or different and is a monovalent, SiC-bonded hydrocarbon radical having 1 to 20 carbon atoms and optionally substituted by fluorine or chlorine,
X may each be identical or different and is an alkylene radical which has 1 to 20 carbon atoms and in which methylene units not adjacent to one another may have been replaced by —O— groups,
A may each be identical or different and is oxygen atom, sulfur atom or an amino group —NR'—,
Z may each be identical or different and is an oxygen atom or an amino group —NR'—,
R' may each be identical or different and is hydrogen atom or an alkyl radical having 1 to 10 carbon atoms,
Y may each be identical or different and is a divalent hydrocarbon radical which has 1 to 20 carbon atoms and is optionally substituted by fluorine or chlorine,
D may each be identical or different and is a divalent hydrocarbon radical which is optionally substituted by fluorine, chlorine or $C_1$-$C_6$ alkyl ester groups and in which methylene units not adjacent to one another may have been replaced by —O—, —COO—, —OCO— or —OCOO— groups, B may each be identical or different and is hydrogen or a functional or nonfunctional organic or silicon-organic radical, n may each be identical or different and is a number from 50 to 2999, a is a number which is at least 1, b is 0 or a number from 1 to 100, c is 0 or a number from 1 to 100, d is a number which is at least 1, and e is a number which is 0 or 1.

The weight ratio of the siloxane-organic copolymer (B) to the polyamide polymer (A) is preferably in the range from 5:95 to 80:20, more preferably 10:90 to 60:40, most preferably 20:80 to 50:50.

The polymer compositions of the invention are preferably thermoplastic And are preferably reprocessable.

Examples of R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl, and the 2-propenyl radicals; aryl radicals such as the phenyl, naphthyl, anthryl, and phenanthryl radicals; alkaryl radicals such as o-, m-, p-tolyl radicals, xylyl radicals and ethylphenyl radicals; or aralkyl radicals such as the benzyl radical or the α- and the β-phenylethyl radicals.

Examples of halogenated radicals R are haloalkyl radicals such as the 3,3,3-trifluoro-n-propyl radical, the 2,2,2,2',2',2"-hexafluoroisopropyl radical and the heptafluoroisopropyl radical.

Radical R is preferably a monovalent hydrocarbon radical which has 1 to 20 carbon atoms and is optionally substituted by fluorine and/or chlorine atoms, more preferably is a hydrocarbon radical which has 1 to 6 carbon atoms, and most preferably is the methyl, ethyl, vinyl or phenyl radical.

Examples of radical X are the alkylene radicals indicated below for radical Y. Radical X preferably comprises an alkylene radical having 1 to 10 carbon atoms, more preferably the methylene or n-propylene radical.

A is preferably a radical —NR'— where R' matches the definition stated above, more preferably a —NH— radical.

Radical R' is preferably hydrogen atom.

Radical Z preferably has the definition of —O— or —NH—.

Examples of radical Y are alkylene radicals such as the methylene, ethylene, n-propylene, isopropylene, n-butylene, isobutylene, tert-butylene, n-pentylene, isopentylene, neopentylene, and tert-pentylene radicals, hexylene radicals, heptylene radicals, octylene radicals, nonylene radicals, decylene radicals, dodecylene radicals, and octadecylene radicals; cycloalkylene radicals such as cyclopentylene, 1,4-cyclohexylene, isophoronylene, 4,4'-methylenedicyclohexylene radicals; alkenylene radicals such as the vinylene, n-hexenylene, cyclohexenylene, 1-propenylene, allylene, butenylene, and 4-pentenylene radical; alkynylene radicals such as the ethynylene and propargylene radicals; arylene radicals such as the phenylene, bisphenylene, naphthylene, anthrylene, and phenanthrylene radicals; alkarylene radicals such as o-, m-, p-tolylene radicals, xylylene radicals and ethylphenylene radicals; and aralkylene radicals such as the benzylene radical, the 4,4'-methylenediphenylene radical, and the α- or the β-phenylethylene radicals.

Radical Y preferably comprises a hydrocarbon radical having 3 to 13 carbon atoms, more preferably a linear or cyclic alkylene radical.

Examples of radicals D are the examples indicated for Y, and also polyoxyalkylene radicals, such as polyoxyethylene radicals or polyoxypropylene radicals.

D is preferably a divalent hydrocarbon radical which has 1 to 700 carbon atoms and is optionally substituted by fluorine atoms, chlorine atoms or $C_1$-$C_6$ alkyl ester groups, or is a polyoxyalkylene radical. Where D is an optionally substituted hydrocarbon radical, it preferably comprises alkylene radicals having 2 to 12 carbon atoms, more particularly having 4 to 12 carbon atoms. Where D is a polyoxyalkylene radical, it preferably contains 20 to 800 carbon atoms, more preferably 20 to 200 carbon atoms, most preferably 20 to 100 carbon atoms, and especially, D comprises polyoxyethylene radicals or polyoxypropylene radicals.

Index n is preferably a number from 99 to 800, more preferably from 120 to 300, most preferably from 120 to 200.

Preferably a is a number from 1 to 1000, more preferably from 3 to 250, most preferably from 5 to 100.

If b is not 0, b is preferably a number from 1 to 250, more preferably 1 to 30. Preferably b is less than or equal to the sum of a+c+e, and with particular preference, b is 0.

Index c is preferably 0 or a number from 1 to 10, more preferably 0 or a number from 1 to 5.

Preferably d is a number from 1 to 30, more preferably from 1 to 20, most preferably from 1 to 10.

The organopolysiloxane/polyurea/polyurethane block copolymers are already known and are produced preferably by methods in accordance with the prior art, as described in EP-A 250248, EP-A 822951 or DE-A 10137855, for example, more preferably as described in DE-A 10137855.

Possible end groups B in formula (1) are customary end groups according to the prior art that come about as standard during the synthesis of such polymers - examples are hydrogen or isocyanate end groups. These end groups may also be reacted with further groups during the polymer synthesis or subsequently, such as with aliphatic amines, alcohols or else amino- or isocyanato-silanes, for example. It is possible, moreover, during the synthesis itself to add monofunctional organic compounds which are reactive toward isocyanate groups, such as, for example, primary or secondary alcohols or amines, it being possible thereby in an elegant manner to additionally control the rheological properties and the molecular weight of the siloxane-organic copolymers (B).

Preferred examples of end groups B besides hydrogen, are structures of the general formulae:

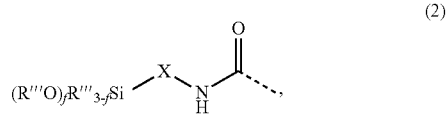

(2)

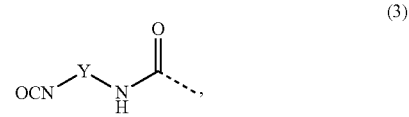

(3)

-continued

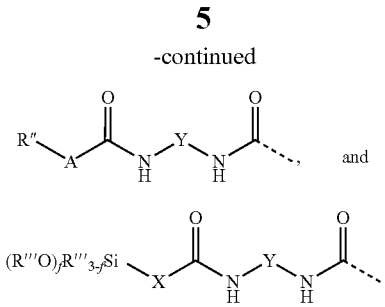

(4)

and (5)

where

X may each be identical or different and is an alkylene radical which has 1 to 20 carbon atoms and in which methylene units not adjacent to one another may have been replaced by —O— groups, A may each be identical or different and is oxygen, sulfur or an amino group —NR'—, R' may each be identical or different and is hydrogen or an alkyl radical having 1 to 10 carbon atoms, R" may each be identical or different and is hydrogen or an alkyl radical having 1 to 20 carbon atoms, Y may each be identical or different and is a divalent hydrocarbon radical which has 1 to 20 carbon atoms and is optionally substituted by fluorine or chlorine, R''' may each be identical or different and is an alkyl radical having 1 to 20 carbon atoms, and f is 0, 1, 2 or 3.

Examples of radical R" are hydrogen and also the examples indicated above for radical R. Radical R" preferably comprises an alkyl radical having 3 to 12 carbon atoms.

Examples of radical R''' are the examples indicated above for radical R. Preferably radical R''' is an alkyl radical having 1 to 4 carbon atoms, more preferably the methyl or ethyl radical.

The end groups B are more preferably urea groups of the general formula (3), of the general formula (4) or of the general formula (5).

In the case of the component (B) used in accordance with the invention, the amount of siloxane units is preferably between 80 and 99.5 wt %, more preferably between 90 and 99 wt %, most preferably between 95 and 99 wt %.

Examples of siloxane-organic copolymers (B) are $(C_2H_5O)_3$—Si—$C_3H_6$—NH—CO—[NH—$(CH_2)_3$—Si$(CH_3)_2$—(O—Si$(CH_3)_2)_{130-160}$—$(CH_2)_3$—NH—CO—NH-p-$C_6H_{10}$—$CH_2$-p-$C_6H_{10}$—NH—CO]$_{15-25}$—NH$(CH_2)_3$SiMe$_2$(OSiMe$_2)_{130-160}$—$(CH_2)_3$—NH—CO—NH—$C_3H_6$—Si$(OC_2H_5)_3$, $(H_3CO)_3$—Si—$C_3H_6$—NH—CO—[NH—$(CH_2)_3$—Si$(CH_3)_2$—(O—Si$(CH_3)_2)_{130-160}$—$(CH_2)_3$—NH—CO—NH-p-$C_6H_{10}$—$CH_2$-p-$C_6H_{10}$—NH—CO]$_{15-25}$—NH$(CH_2)_3$SiMe$_2$(OSiMe$_2)_{130-160}$ $(CH_2)_3$—NH—CO—NH—$C_3H_6$—Si$(OCH_3)_3$, $(C_2H_5O)_3$—Si—$CH_2$—NH—CO—[NH—$(CH_2)_3$—Si$(CH_3)_2$—(O—Si$(CH_3)_2)_{130-160}$—$(CH_2)_3$—NH—CO—NH-p-$C_6H_{10}$—$CH_2$-p-$C_6H_{10}$—NH—CO]$_{15-25}$—NH$(CH_2)_3$SiMe$_2$(OSiMe$_2)_{130-160}$—$(CH_2)_3$—NH—CO—NH—$CH_2$—Si$(OC_2H_5)_3$, $(H_5C_2O)_3$—Si—$C_3H_6$—NH—CO—NH-p-$C_6H_{10}$—$CH_2$-p-$C_6H_{10}$—NH—CO—[NH—$(CH_2)_3$—Si$(CH_3)_2$—(O—Si$(CH_3)_2)_{130-160}$—$(CH_2)_3$—NH—CO—NH-p-$C_6H_{10}$—$CH_2$-p-$C_6H_{10}$—NH—CO]$_{15-25}$—[NH—$(CH_2)_3$—Si$(CH_3)_2$—(O'Si$(CH_3)_2)_{130-160}$—$(CH_2)_3$—NH—CO—NH-p-$C_6H_{10}$—$CH_2$-p-$C_6H_{10}$—NH]—CO—NH—$C_3H_6$—Si$(OC_2H_5)_3$, $(H_5C_2O)_3$—Si—$CH_2$—NH—CO—NH-p-$C_6H_{10}$—$CH_2$-p-$C_6H_{10}$—NH—CO—[NH—$(CH_2)_3$—Si$(CH_3)_2$—(O—Si$(CH_3)_2)_{130-160}$—$(CH_2)_3$—NH—CO—NH-p-$C_6H_{10}$—$CH_2$-p-$C_6H_{10}$—NH—CO]$_{15-25}$—[NH—$(CH_2)_3$—Si$(CH_3)_2$—(O—Si$(CH_3)_2)_{130-160}$—$(CH_2)_3$—NH—CO—NH-p-$C_6H_{10}$—$CH_2$-p-$C_6H_{10}$—NH]—CO—NH—$CH_2$—Si$(OC_2H_5)_3$, $(H_3CO)_3$—Si—$C_3H_6$—NH—CO—NH-p-$C_6H_{10}$—$CH_2$-p-$C_6H_{10}$—NH—CO—[NH—$(CH_2)_3$—Si$(CH_3)_2$—(O—Si$(CH_3)_2)_{130-160}$—$(CH_2)_3$—NH—CO—NH-p-$C_6H_{10}$—$CH_2$p-$C_6H_{10}$—NH—CO]$_{15-25}$—[NH—$(CH_2)_3$—Si$(CH_3)_2$—(O—Si$(CH_3)_2)_{130-160}$—$(CH_2)_3$—NH—CO—NH-p-$C_6H_{10}$—$CH_2$-p-$C_6H_{10}$—NH]—CO—NH—$C_3H_6$—Si$(OCH_3)_3$, $H_3C(H_3CO)_2$—Si—$C_3H_6$—NH—CO—NH-p-$C_6H_{10}$—$CH_2$-p-$C_6H_{10}$—NH—CO—[NH—$(CH_2)_3$—Si$(CH_3)_2$—(O—Si$(CH_3)_2)_{130-160}$—$(CH_2)_3$—NH—CO—NH-p-$C_6H_{10}$—$CH_2$p-$C_6H_{10}$—NH—CO]$_{15-25}$—[NH—$(CH_2)_3$—Si$(CH_3)_2$—(O—Si$(CH_3)_2)_{130-160}$—$(CH_2)_3$—NH—CO—NH-p-$C_6H_{10}$—$CH_2$-p-$C_6H_{10}$—NH]—CO—NH—$C_3H_6$—Si$(OCH_3)_2CH_3$, n-$C_4H_9$—NH—CO—NH-p-$C_6H_{10}$—$CH_2$-p-$C_6H_{10}$—NH—CO—[NH—$(CH_2)_3$—Si$(CH_3)_2$—(O—Si$(CH_3)_2)_{130-160}$—$(CH_2)_3$—NH—CO—NH-p-$C_6H_{10}$—$CH_2$-p-$C_6H_{10}$—NH—CO]$_{15-25}$—[NH—$(CH_2)_3$—Si$(CH_3)_2$—(O—Si$(CH_3)_2)_{130-160}$—$(CH_2)_3$—NH—CO—NH-p-$C_6H_{10}$—$CH_2$-p-$C_6H_{10}$—NCO, n-$C_4H_9$—NH—CO—NH-p-$C_6H_{10}$—$CH_2$-p-$C_6H_{10}$—NH—CO—[NH—$(CH_2)_3$—Si$(CH_3)_2$—(O—Si$(CH_3)_2)_{130-160}$—$(CH_2)_3$—NH—CO—NH-p-$C_6H_{10}$—$CH_2$-p-$C_6H_{10}$—NH—CO]$_{15-25}$—[NH—$(CH_2)_3$—Si$(CH_3)_2$—(O—Si$(CH_3)_2)_{130-160}$—$(CH_2)_3$—NH—CO—NH-p-$C_6H_{10}$—$CH_2$-p-$C_6H_{10}$—NH—CO—NH-n-$C_4H_9$ $(C_2H_5O)_3$—Si—$C_3H_6$—NH—CO—[NH—$(CH_2)_3$—Si$(CH_3)_2$—(O—Si$(CH_3)_2)_{130-160}$—$(CH_2)_3$—NH—CO—NH—$C_{10}H_{18}$—NH—CO]$_{25-35}$—NH $(CH_2)_3$SiMe$_2$(OSiMe$_2)_{130-160}(CH_2)_3$—NH—CO—NH—$C_3H_6$—Si$(OC_2H_5)_3$, $(C_2H_5O)_3$—Si—$CH_2$—NH—CO—[NH—$(CH_2)_3$—Si$(CH_3)_2$—(O—Si$(CH_3)_2)_{130-160}$—$(CH_2)_3$—NH—CO—NH—$C_{10}H_{18}$—NH—CO]$_{25-35}$—NH$(CH_2)_3$SiMe$_2$(OSiMe$_2)_{130-160}(CH_2)_3$—NH—CO—NH—$CH_2$Si$(OC_2H_5)_3$, $(H_3CO)_3$—Si—$C_3H_6$—NH—CO—[NH—$(CH_2)_3$—Si$(CH_3)_2$—(O—Si$(CH_3)_2)_{130-160}$—$(CH_2)_3$—NH—CO—NH—$C_{10}H_{18}$—NH—CO]$_{25-35}$—NH$(CH_2)_3$SiMe$_2$(OSiMe$_2)_{130-160}(CH_2)_3$—NH—CO—NH—$C_3H_6$—Si$(OCH_3)_3$, $(H_3CO)_3$—Si—$C_3H_6$—NH—CO—[NH—$(CH_2)_3$—Si$(CH_3)_2$—(O—Si$(CH_3)_2)_{130-160}$—$(CH_2)_3$—NH—CO—NH—$C_{10}H_{18}$—NH—CO]$_{10-15}$—[NH—$C_6H_{12}$—NH—CO—NH—$C_{10}H_{18}$—NH—CO]$_5$—NH$(CH_2)_3$SiMe$_2$(OSiMe$_2)_{130-160}(CH_2)_3$—NH—CO—NH—$C_3H_6$—Si$(OCH_3)_3$, $(H_3CO)_3$Si—$C_3H_6$—NH—CO—NH—$C_{10}H_{18}$—NH—CO—[NH—$(CH_2)_3$—Si$(CH_3)$—(O—Si$(CH_3)_2)_{130-160}$—$(CH_2)_3$NH—CO—NH—$C_{10}H_{18}$—NH—CO]$_{10-15}$[NH—$(CH_2)_3$—Si$(CH_3)$—(O—Si$(CH_3)_2)_{130-160}$—$(CH_2)_3$—NH—CO—NH—$C_{10}H_{18}$—NH]—CO—NH—$C_3H_6$—Si$(OCH_3)_3$, $H_3C$ $(H_3CO)_2$—Si—$C_3H_6$NH—CO—NH—$C_{10}H_{18}$—NH—CO—[NH—$(CH_2)_3$—Si$(CH_3)_2$—(O—Si$(CH_3)_2)_{130-160}$—$(CH_2)_3$NH—CO—NH—$C_{10}H_{18}$—NH—CO]$_{25-35}$—NH—$(CH_2)_3$—Si$(CH_3)$—(O—Si$(CH_3)_2)_{130-160}$—$(CH_2)_3$—NH—CO—NH—$C_{10}H_{18}$—NH—CO—NH—$C_3H_6$—Si$(OCH_3)_2CH_3$, $(H_5C_2O)_3$—Si—$C_3H_6$—NH—CO—NH—$C_{10}H_{18}$—NH—CO—[NH—$(CH_2)$—Si$(CH_3)_2$—(O—Si$(CH_3)_2)_{130-160}$—$(CH_2)_3$NH—CO—NH—$C_{10}H_{18}$—NH—CO]$_{25-35}$—NH—

$(CH_2)_3$—$Si(CH_3)_2$—(O—$Si(CH_3)_2)_{130-1610}$—$(CH_2)_3$—NH—CO—NH—$C_{10}H_{18}$—NH—CO—NH—$C_3H_6$—Si$(OC_2H_5)_3$, $(C_2H_5O)_3$—Si—$C_3H_6$—NH—CO—[NH—$(CH_2)_3$—Si$(CH_3)_2$—(O'Si$(CH_3)_2)_{130-160}$—$(CH_2)_3$—NH—CO—NH—$C_6H_{12}$—NH—CO]$_{25-35}$—NH$(CH_2)_3$SiMe$_2$(OSiMe$_2)_{130-160}$$(CH_2)_3$—NH—CO—NH—$C_3H_6$—Si$(OC_2H_5)_3$, $(C_2H_5O)_3$—Si—$CH_2$—NH—CO—[NH—$(CH_2)_3$—Si$(CH_3)_2$—(O—Si$(CH_3)_2)_{130-160}$—$(CH_2)_3$—NH—CO—NH—$C_6H_{12}$—NH—CO]$_{25-35}$—NH$(CH_2)_3$SiMe$_2$(OSiMe$_2)_{130-160}$$(CH_2)_3$—NH—CO—NH—$CH_2$—Si$(OC_2H_5)_3$, $(H_3CO)_3$—Si—$C_3H_6$—NH—CO—[NH—$(CH_2)_3$—Si$(CH_3)_2$—(O—Si$(CH_3)_2)_{130-160}$—$(CH_2)_3$—NH—CO—NH—$C_6H_{12}$—NH—CO]$_{25-35}$—NH$(CH_2)_3$SiMe$_2$(OSiMe$_2)_{130-160}$$(CH_2)_3$—NH—CO—NH—$C_3H_6$—Si$(OCH_3)_3$, $(H_3CO)_3$—Si—$C_3H_6$—NH—CO—NH—$C_6H_{12}$—NH—CO—[NH—$(CH_2)_3$—Si$(CH_3)_2$—(O—Si$(CH_3)_2)_{130-160}$—$(CH_2)_3$—NH—CO—NH—$C_6H_{12}$—NH—CO]$_{25-35}$—NH—$(CH_2)_3$—Si$(CH_3)_2$—(O—Si$(CH_3)_2)_{130-160}$—$(CH_2)_3$—NH—CO—NH—$C_6H_{12}$—NH—CO—NH—$C_3H_6$—Si$(OCH_3)_3$, $H_3C$ $(H_3CO)_2$—Si—$C_3H_6$—NH—CO—NH—$C_6H_{12}$—NH—CO—[NH—$(CH_2)_3$—Si$(CH_3)_2$—(O—Si$(CH_3)_2)_{130-160}$—$(CH_2)_3$—NH—CO—NH—$C_6H_{12}$—NH—CO]$_{25-35}$—NH—$(CH_2)_3$—Si$(CH_3)_2$—(O—Si$(CH_3)_2)_{130-160}$—$(CH_2)$—NH—CO—NH—$C_6H_{12}$—NH—CO—NH—$C_3H_6$—Si$(OCH_3)_2CH_3$, $(H_5C_2O)_3$—Si—$C_3H_6$—NH—CO—NH—$C_6H_{12}$—NH—CO—[NH—$(CH_2)_3$—Si$(CH_3)_2$—(O—Si$(CH_3)_2)_{130-160}$—$(CH_2)_3$—NH—CO—NH—$C_6H_{12}$—NH—CO]$_{25-35}$—NH—$(CH_2)_3$—Si$(CH_3)_2$—(O—Si$(CH_3)_2)_{130-160}$—$(CH_2)_3$—NH—CO—NH—$C_6H_{12}$—NH—CO—NH—$C_3H_6$—Si$(OC_2H_5)_3$, $(C_2H_5O)_3$—Si—$C_3H_6$—NH—CO—[NH—$(CH_2)_3$—Si$(CH_3)_2$—(O—Si$(CH_3)_2)_{180-220}$—$(CH_2)_3$—NH—CO—NH-p-$C_6H_{10}$—$CH_2$-p-$C_6H_{10}$—NH—CO]$_{10-20}$—NH$(CH_2)_3$SiMe$_2$(OSiMe$_2)_{180-220}$—$(CH_2)_3$—NH—CO—NH—$C_3H_6$—Si$(OC_2H_5)_3$, $(C_2H_5O)_3$—Si—$CH_2$—NH—CO—[NH—$(CH_2)_3$—Si$(CH_3)_2$—(O—Si$(CH_3)_2)_{180-220}$—$(CH_2)_3$—NH—CO—NH-p-$C_6H_{10}$—$CH_2$-p-$C_6H_{10}$—NH—CO]$_{8-20}$—NH$(CH_2)_3$SiMe$_2$(OSiMe$_2)_{180-220}$$(CH_2)_3$—NH—CO—NH—$CH_2$—Si$(OC_2H_5)_3$, $(C_2H_5O)_3$—Si—$C_3H_6$—NH—CO—[NH—$(CH_2)_3$—Si$(CH_3)_2$—(O—Si$(CH_3)_2)_{180-220}$—$(CH_2)_3$—NH—CO—NH-p-$C_6H_{10}$—$CH_2$-p-$C_6H_{10}$—NH—CO]$_{8-20}$—[NH—$CH_2$—$CH_2$—NH—CO—NH-p-$C_6H_{10}$—$CH_2$-p-$C_6H_{10}$—NH—CO]$_{3-8}$—NH$(CH_2)_3$SiMe$_2$(OSiMe$_2)_{180-220}$$(CH_2)_3$—NH—CO—NH—$C_3H_6$—Si$(OC_2H_5)_3$, $(C_2H_5O)_3$—Si—$CH_2$—NH—CO—[NH—$(CH_2)_3$—Si$(CH_3)_2$—(O—Si$(CH_3)_2)_{180-220}$—$(CH_2)_3$—NH—CO—NH-p-$C_6H_{10}$—$CH_2$-p-$C_6H_{10}$—NH—CO]$_{8-20}$—[NH—$CH_2$—$CH_2$—NH—CO—NH-p-$C_6H_{10}$—$CH_2$-p-$C_6H_{10}$—NH—CO]$_{3-8}$—NH$(CH_2)_3$SiMe$_2$(OSiMe$_2)_{180-220}$$(CH_2)_3$—NH—CO—NH—$CH_2$—Si$(OC_2H_5)_3$, n-$C_4H_9$—NH—CO—NH-p-$C_6H_{10}$—$CH_2$-p-$C_6H_{10}$—NH—CO—[NH—$(CH_2)_3$—Si$(CH_3)_2$—(O—Si$(CH_3)_2)_{180-220}$—$(CH_2)_3$—NH—CO—NH-p-$C_6H_{10}$—$CH_2$-p-$C_6H_{10}$—NH—CO]$_{8-20}$—NH-n-$C_4H_9$, n-$C_4H_9$—NH—CO—NH-p-$C_6H_{10}$—$CH_2$-p-$C_6H_{10}$—NH—CO—[NH—$(CH_2)_3$—Si$(CH_3)_2$—(O—Si$(CH_3)_2)_{250-280}$—$(CH_2)_3$NH—CO—NH-p-$C_6H_{10}$—$CH_2$-p-$C_6H_{10}$—NH—CO]$_{6-15}$—NH-n-$C_4H_9$ n-$C_4H_9$NH—CO—NH—$C_{10}H_{18}$—NH—CO—[NH—$(CH_2)_3$—Si$(CH_3)_2$—(O—Si$(CH_3)_2)_{180-220}$—$(CH_2)_3$NH—CO—NH—$C_{10}H_{18}$NH—CO]$_{8-20}$NH-n-$C_4H_9$, n-$C_4H_9$NH—CO—NH—$C_6H_{12}$NH—CO[NH—$(CH_2)_3$—Si$(CH_3)_2$—(O—Si$(CH_3)_2)_{180-220}$—$(CH_2)_3$—NH—CO—NH—$C_6H_{12}$—NH—CO]$_{8-20}$NH-n-$C_4H_9$, n-$C_4H_9$NH—CO—NH-p-$C_6H_{10}$—$CH_2$-p-$C_6H_{10}$—NH—CO—[NH—$(CH_2)_3$—Si$(CH_3)_2$—(O—Si$(CH_3)_2)_{180-220}$—$(CH_2)_3$NH—CO—NH-p-$C_6H_{10}$—$CH_2$-p-$C_6H_{10}$—NH—CO]$_{8-20}$—[NH—$(CH_2)_3$Si$(CH_3)_2$—(O—Si$(CH_3)_2)_{180-220}$—$(CH_2)_3$—NH—CO—NH—$C_{10}H_{18}$—NH—CO]$_{4-10}$NH-n-$C_4H_9$, n-$C_4H_9$NH—CO—NH-p-$C_6H_{10}$—$CH_2$-p-$C_6H_{10}$—NH—CO—[NH—$(CH_2)_3$—Si$(CH_3)_2$—(O—Si$(CH_3)_2)_{180-220}$—$(CH_2)_3$NH—CO—NH-p-$C_6H_{10}$—$CH_2$-p-$C_6H_{10}$—NH—CO]$_{8-20}$—NH—$(CH_2)_3$—Si$(CH_3)_2$—(O—Si$(CH_3)_2)_{180-220}$—$(CH_2)_3$—NH$_2$, n-$C_4H_9$NH—CO—NH—$C_{10}H_{18}$—NH—CO—[NH—$(CH_2)_3$—Si$(CH_3)_2$—(O—Si $CH_3)_2)_{180-220}$—$(CH_2)_3$—NH—CO—NH—$C_{10}H_{18}$—NH—CO]$_{8-20}$—NH—$(CH_2)_3$—Si$(CH_3)_2$—(O—Si$(CH_3)_2)_{180-220}$—$(CH_2)_3$—NH$_2$, n-$C_4H_9$NH—CO—NH—$C_{10}H_{18}$—NH—CO[NH—$(CH_2)_3$—Si$(CH_3)$—(O—Si$(CH_3)_2)_{250-280}$—$(CH_2)_3$NH—CO—NH—$C_{10}H18$—NH—CO]$_{8-20}$—NH—$(CH_2)_3$—Si$(CH_3)_2$—(O—Si$(CH_3)_2)_{250-280}$—$(CH_2)_3$—NH$_2$,

H—[NH—$(CH_2)_3$—Si$(CH_3)_2$—(O—Si$(CH_3)_2)_{180-220}$—$(CH_2)_3$—NH—CO—NH-p-$C_6H_{10}$—$CH_2$-p-$C_6H_{10}$—NH—CO]$_{8-20}$—[NH—$(CH_2)_3$—Si$(CH_3)_2$—(O—Si$(CH_3)_2)_{180-220}$—$(CH_2)_3$—NH$_2$,

H[NH—$(CH_2)_3$—Si$(CH_3)_2$—(O—Si$(CH_3)_2)_{180-220}$—$(CH_2)_3$—NH—CO—NH—$C_6H_{12}$—NH—CO]$_{8-20}$—NH—$(CH_2)_3$—Si$(CH_3)_2$—(O—Si$(CH_3)_2)_{180-220}$—$(CH_2)_3$—NH$_2$, n-$C_4H_9$—NH—CO—NH-p-$C_6H_{10}$—$CH_2$-p-$C_6H_{10}$—NH—CO—[NH—$(CH_2)_3$—Si$(CH_3)_2$—(O—Si$(CH_3)_2)_{180-220}$—$(CH_2)_3$—NH—CO—NH-p-$C_6H_{10}$—$CH_2$-p-$C_6H_{10}$—NH—CO]$_{8-20}$—[NH—$(CH_2)_3$—Si$(CH_3)_2$—(O—Si$(CH_3)_2)_{180-220}$—$(CH_2)_3$—NH—CO—NH—$C_{10}H_{18}$—NH—CO]$_{4-10}$NH—$(CH_2)_3$—Si$(CH_3)_2$—(O—Si$(CH_3)_2)_{180-220}$—$(CH_2)_3$—NH$_2$, and n-$C_4H_9$—NH—CO—NH-p-$C_6H_{10}$—$CH_2$-p-$C_6H_{10}$—NH—CO—[NH—$(CH_2)_3$—Si$(CH_3)_2$—(O—Si$(CH_3)_2)_{250-280}$—$(CH_2)_3$—NH—CO—NH-p-$C_6H_{10}$—$CH_2$-p-$C_6H_{10}$—NH—CO]$_{10-15}$—[NH—$(CH_2)_3$—Si$(CH_3)_2$—(O—Si$(CH_3)_2)_{250-280}$—$(CH_2)_3$—NH—CO—NH—$C_{10}H_{18}$—NH—CO]$_{4-10}$NH—$(CH_2)_3$—Si$(CH_3)_2$—(O—Si$(CH_3)_2)_{250-280}$—$(CH_2)_3$—NH$_2$.

Component (B) more particularly comprises copolymers of formula (1) with R=—$CH_3$, X=—$C_3H_6$—, A=—NH— or —O—, but preferably —NH—, Z=—NH— or —O—, but preferably —NH—, R'=hydrogen, Y=—$C_6H_{10}$—$CH_2$—$C_6H_{10}$— or —$C_{10}H_{18}$—, D=—$C_2H_4$— or —$C_6H_{12}$—, B=radical of the formula

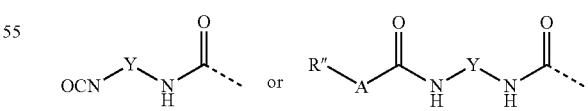

with R''=—$C_4H_9$ or —$C_{12}H_{25}$, and n=a number from 120 to 300, a=a number from 5 to 100, b=0, 1 or 2, c=0 or 1, but preferably 0, d=at least 1, and also e=0 or 1.

The copolymers (B) used in accordance with the invention preferably have a Shore A hardness of below 50, more preferably below 40 and most preferably below 30. The copolymers (B) used in accordance with the invention preferably have a Shore A hardness of preferably at least 5.

The Shore A hardness here is determined in accordance with DIN EN 53505.

The average molecular weight $M_n$ (number average) of component (B) is preferably at least 50,000 g/mol, more preferably at least 100,000 g/mol. The copolymers (B) used in accordance with the invention preferably have an average molecular weight $M_n$ of at most 1,000,000 g/mol.

The number-average molar mass Mn in the context of the present invention is determined by means of size exclusion chromatography (SEC) against polystyrene standard, in THF, at 45° C., flow rate 1.0 ml/min, and detection with ELSD (evaporative light scattering detector) on a triple column set of PLGel MixC columns from Agilent Technologies with an injection volume of 100 μL after acetylation with acetic anhydride.

The siloxane-organic copolymers (B) used in accordance with the invention are preferably solid at 25° C. and 1000 hPa.

The siloxane-organic copolymers (B) used in accordance with the invention preferably have a softening range at 1000 hPa of greater than or equal to 50° C., more preferably above 80° C., yet more preferably above 120° C., and most preferably from 140 to 220° C.

For the purposes of this invention, the softening range here is defined as the temperature range (at shear rates of 0.1 1/s to 1000 1/s), in which the loss factor (G"/G') according to ISO 6721-10 has a value of 1.

For the purposes of the present invention, the term "polymer" encompasses homopolymers, copolymers or terpolymers.

The polyamide polymers (A) used in accordance with the invention are preferably free from Si atoms.

The polyamide polymers (A) used in accordance with the invention may comprise homopolyamides or copolyamides, with copolyamides being preferred.

Polyamide polymers are already known per se and in terms of their monomer composition can be subdivided into homopolyamides and copolyamides.

Homopolyamides (A) derive from an aminocarboxylic acid or from a lactam, or from a diamine and a dicarboxylic acid. Such polyamides can be described by means of a single repeating unit. Examples thereof are the polyamide of caprolactam $[NH-(CH_2)_5-CO]_n$ (PA 6) or the polyamide of hexamethylenediamine and adipic acid $[NH-(CH_2)_6-NH-CO-(CH_2)_4-CO]_n$ (PA 6.6) or, for example, the polyamide of laurolactam or ω-aminododecanoic acid (PA 12).

Copolyamides (A) derive from a plurality of different monomers. Such polyamides can be described only by statement of a plurality of repeating units. Examples thereof are the polyamide of caprolactam, hexamethylenediamine, and adipic acid $[NH-(CH_2)_6-NH-CO-(CH_2)_4-CO]_n-[NH-(CH_2)_5-CO]_m$ (PA 6/66), or polyamides of hexamethylenediamine, adipic acid, and sebacic acid $[NH-(CH_2)_6-NH-CO-(CH_2)_4-CO]_n-[NH-(CH_2)_6-NH-CO-(CH_2)_8-CO]_m$ (PA 66/610). It should be noted that the stated formulae describe only the polymer composition, but not the sequence of the monomer units; these units are customarily distributed statistically over the polymer chains.

Further suitable building blocks for producing copolyamides (A) are additional organic dicarboxylic acids, polyetherdiols, polyesterdiols, and polyetherdiamines. Depending on the additional building blocks, the copolyamides then comprise polyetheresteramides, polyetheramides, polyesteramides, etc.

They are disclosed in patents including U.S. Pat. Nos. 4,331,786, 411,575, 4,195,015, 4,839,441, 4,864,014, 4,230,838, or 4,332,920.

The polyamide polymers (A) are preferably thermoplastic, meaning that the products are solid at 25° C. and 1000 hPa and can be deformed reversibly within a certain temperature range above 25° C. at 1000 hPa.

Preferred for use as component (A) are polyamides having a softening point under a pressure of 1000 hPa of between 150 and 300° C., more preferably having a softening point of between 160 and 230° C., and most preferably between 160 and 210° C. Copolyamides of these kinds are disclosed in patents including U.S. Pat. No. 4,483,975, DE-A 3730504, and U.S. Pat. No. 5,459,230.

The polyamide polymers (A) used in accordance with the invention preferably have elastomeric flexible segments. If component (A) has elastomeric flexible segments, the fraction thereof is preferably between 5 and 85 wt %, more preferably between 20 and 60 wt %. Copolyamides of these kinds are described in patents including U.S. Pat. No. 6,916,517.

The elastomeric flexible segments optionally present in component (A) are preferably polyether blocks, more preferably polyether blocks based on polytetramethylene glycol.

The elastomeric flexible segments preferably used are preferably incorporated in the copolyamide via ester groups or amide groups.

The polyamides used preferably have a tensile modulus of below 5000 MPa, more preferably below 1000 MPa, and most preferably below 200 MPa (determined in each case by means of ISO 527 on samples conditioned for 14 days at 25° C. and 50% relative humidity).

The thermoplastic behavior of a copolyamide which comprises elastomeric flexible segments is determined substantially by the polyamide part, and the elastomeric properties of this copolyamide are determined by the polyether part. Such copolyamides are referred to or abbreviated as in general PAE, TPE-A, TPA or PEBA (polyether-block-amides) by one skilled in the art.

Methods for producing the thermoplastic copolyamides (A) used in accordance with the invention are well-known.

Their preparation and use, and also the raw materials and compositions used for preparing copolyamides, are described in references including Ullmann's Encyclopedia of Industrial Chemistry in the section on "Thermoplastic Polyamide Elastomers".

Preferred examples of TPE-As used as component (A) in accordance with the invention comprise polyamide-12-based TPE-A such as, for example, various PEBAX products (Arkema SA, Colombes, FR) or Vestamid E products (Evonik AG, Essen, DE).

With particular preference the component (A) used in accordance with the invention comprises polyether-based TPE-As based on polyamide 12 and polytetramethylene glycol, such as, for example, PEBAX® 2533, PEBAX® 3533, PEBAX® 4033, PEBAX® 5533 and PEBAX® MX 1205 (available commercially from Arkema SA, Colombes, FR).

The component (A) used is preferably colorless.

Polyamides (A) used in accordance with the invention preferably have a Shore A hardness of at most 90, more preferably of below 80, and very preferably of at most 70. Polyamides (A) preferably have a Shore A hardness of at least 40.

Polyamides (A) used in accordance with the invention preferably have a tensile strength of greater than 15 MPa, more preferably greater than 20 MPa, and most preferably greater than 25 MPa. Polyamides (A) have a tensile strength of at most 70 MPa.

The elongation at break of preferably copolyamides (A) has a value preferably greater than 300%, more preferably greater than 500%, yet more preferably greater than 700%, but at most an elongation at break of 1500%.

The polyamides (A) used in accordance with the invention are preferably solid at 25° C. and 1000 hPa.

Polyamides (A) are preferably used in accordance with the invention preferably in pellet form.

In addition to the components (A) and (B), the polymer compositions of the invention may comprise further substances different from the components (A) and (B), such as, for example, nonpolyamide polymers (A'), organic or inorganic fillers (C), inorganic fibers (D), flame retardants (E), biocides (F), pigments (G), UV absorbers (H), and HALS stabilizers (I).

Polymers (A'), used optionally, are preferably thermoplastic, meaning that the products are solid at 25° C. and 1000 hPa and can be deformed reversibly in a defined temperature range above 25° C. at 1000 hPa.

Preferred examples of optionally used thermoplastic polymer (A') are polyurethanes, polyesters, polyacrylates, polyolefins, functional polyolefins, polystyrenes or PVC, with particular preference, polyurethanes or polyesters.

If polymers (A') are used, the amounts are preferably 1 to 40 parts by weight, more preferably 5 to 30 parts by weight, based in each case on 100 parts by weight of component (A). The compositions of the invention preferably contain no polymers (A').

The fillers (C) optionally used in accordance with the invention are preferably inorganic fillers, more preferably quartz, talc, calcium carbonate, kieselguhr or calcium silicate or silicas.

Preferred examples of inorganic fibers (D) used optionally in accordance with the invention are glass fibers, basalt fibers or wollastonite, preferably glass fibers.

If inorganic fibers (D) are used, the amounts are preferably 1 to 30 wt %, more preferably 5 to 15 wt %. The polymer compositions of the invention preferably contain no component (D).

Preferred examples of flame retardants (E) optionally used in accordance with the invention are organic flame retardants based on halogenated organic compounds or inorganic flame retardants, aluminum hydroxide (ATH) or magnesium hydroxide for example.

If flame retardants (E) are used, preference is given to inorganic flame retards such as ATH.

Preferred examples of biocides (F) used optionally in accordance with the invention are inorganic fungicides, such as borates like zinc borate, for example, or organic fungicides like thiabendazole, for example.

Preferred examples of pigments (G) optionally usedin accordance with the invention are organic pigments or inorganic pigments such as iron oxides or titanium dioxide, for example.

If pigments (G) are used, the amounts in question are preferably 0.2 to 7 wt %, more preferably 0.5 to 3 wt %. It is preferred for pigments (G) to be used.

Examples of UV absorbers (H) optionally used in accordance with the invention are benzophenones, benzotriazoles or triazines. If UV absorbers (H) are used, benzotriazoles and triazines are preferred.

Preferred examples of HALS stabilizers (I) optionally used in accordance with the invention are piperidine or piperidyl derivatives for example, and are available under brand names including Tinuvin (BASF SE, Ludwigshafen (DE)).

To produce the compositions of the invention, preferably no ingredients beyond components (A), (B), optionally (A') and also optionally (C) to (I) are used.

The individual ingredients of the composition of the invention may in each case comprise one kind of such an ingredient or else a mixture of at least two different kinds of such ingredients.

The polymer compositions of the invention have preferably both thermoplastic and elastomeric qualities.

Hence the elongation at break of the polymer compositions of the invention is preferably at least 200%, more preferably at least 500%. The elongation at break of the polymer compositions of the invention is preferably not more than 2000%.

The tensile strength of the polymer compositions of the invention is preferably at least 2 MPa, more preferably at least 4 MPa, and most preferably at least 10 MPa. The tensile strength of the polymer compositions of the invention is preferably not more than 50 MPa.

The Shore A hardness of the polymer compositions of the invention is preferably at most 80, more preferably at most 75, and most preferably at most 70, but at least 20.

The softening temperature of the polymer compositions of the invention is preferably at least 40° C., more preferably at least 100° C., and most preferably at least 130° C. at a pressure of 1000 hPa. The softening temperature of the polymer compositions of the invention is preferably not more than 220° C. at a pressure of 1000 hPa.

The compositions of the invention may be produced in any manner desired and known per se, such as, for instance, by simple mixing of the individual components.

The optional ingredients, such as components (A') and also components (C) to (I), for example, may be added during the mixing operation and/or, subsequently to the completed compositions.

A further subject of the invention is a method for producing the compositions of the invention, wherein In a First Step components (A) and (B) and also, optionally, one or more of the components (A') and (C) to (I) are placed into a reactor and melted and are mixed by means of a mixing assembly, In a Second Step the mixture obtained in the first step is discharged and allowed to cool, and In a Third Step, Carried Out Optionally, the mixture obtained in the second step is optionally mixed with one or more of the components (A') and (C) to (I) and is comminuted and/or pelletized.

In the process of the invention, the third step is preferably carried out.

If in the process of the invention the third step is carried out, this may take place after the end of the second step or may be carried out simultaneously with the second step.

The process of the invention may take place in the presence or absence of solvent, with solvent-free production being preferred.

The process of the invention may be carried out continuously, batchwise or semibatchwise, but preferably continuously.

The individual components are added to the reactor in the first step of the process of the invention either separately or in an already premixed form, such as in the form of premixed pellets, for example. This may be done by the prior-art methods such as via metering screws, for example. In the reactor the components are mixed preferably by means of shearing elements such as extruder screws for example. If desired, the reactants to be mixed may be dried in accordance with the prior art before being processed.

The discharge of the mixed composition of the invention in accordance with the second step of the method of the invention may likewise take place by the mixing assembly itself or additionally by means of a transport unit such as a melt pump, for example.

The weight ratio of the component (B) used in the first step of the method of the invention to thermoplastic polyamide (A) is preferably in the range from 5:95 to 80:20, more preferably 10:90 to 60:40, and most preferably 20:80 to 50:50.

With the method of the invention, preferably at least steps 1 to 2 are carried out in continuously operating kneaders or mixers or extruders, and the individual components for mixing in accordance with the invention are supplied continuously to the mixing assembly in the first step, either in pure form or as a premix, gravimetrically or volumetrically in each case. Components which are present in the overall mixture with a proportion of below 1 wt % are supplied preferably as a premix in one of the components with a larger proportion.

The temperatures at which the first step of the method of the invention is carried out depend primarily on the components used and are known to the skilled person, with the proviso that they are below the specific decomposition temperatures of the individual components used. The method of the invention is preferably carried out at temperatures below 250° C., more preferably in the range from 150 to 220° C., and most preferably at temperatures of 180 to 210° C.

The first step of the method of the invention is preferably carried out under the pressure of the surrounding atmosphere, in other words at between 900 and 1100 hPa. Higher pressures, however, may also be employed, and are dependent in particular on the mixing assembly used. Hence the pressure in different regions of the kneaders, mixers or extruders used is, for example, significantly greater than 1000 hPa, preferably greater than 10,000 hPa, and more preferably greater than 20,000 hPa.

The composition produced in accordance with the invention is preferably in pellet form or in powder form, but preferably in pellet form. By means of a corresponding pelletizing system, the composition of the invention can also be obtained in the form of micropellets.

After the operation of mixing the individual components in accordance with the first step, the composition of the invention is then discharged from the reactor in the second step, preferably in the form of a hot melt of high viscosity and preferably via a die, and is caused to cool, preferably by means of a cooling medium, to temperatures of between 5° C. and 60° C. In a preferred method here, the material, following its emergence, is cooled by means of a cooling medium and then comminuted or pelletized in a third step. In this case, the cooling of the material and the pelletizing may take place simultaneously by means of underwater pelletizing or in succession. Preferred cooling media used are water or air. Preferred pelletizing methods here are underwater pelletizing, pelletizing by means of air cutting, and strand pelletizing.

The pellets produced in accordance with the invention have a weight of preferably less than 0.5 g, more preferably less than 0.25 g, more particularly less than 0.125 g per pellet. The pellets produced in accordance with the invention have a weight of preferably at least 5 mg per pellet.

The pellets obtained in accordance with the invention are preferably cylindrical or spherical, with a preferred lengthwise extent in the range from 0.1 to 10 mm, more preferably 1 to 7 mm.

According to one preferred embodiment of the method of the invention, the individual components, preferably in pellet form, in powder form or in the form of fibers, are metered gravimetrically in a multiscrew extruder, where they are melted at temperatures between 180 and 210° C. and mixed, and the mixture is discharged from the mixing assembly by means of a melt pump and by means of underwater pelletizing is cooled, pelletized, and dried.

In the production of the compositions of the invention, it is additionally possible to bring about reaction between any functional groups containing in component (A) and/or component (B), and any functional groups newly formed during the production of the composition of the invention, by hydrolysis or thermal bond breakage, for example. This may take place by methods including the reaction of any carboxylic acid, hydroxy, amine, isocyanate, urethane or urea bonds present or formed, to give amide, ester, urethane, urea or allophanate bonds.

The compositions of the invention are preferably reprocessable. As used herein, "reprocessable" means that the compositions can easily be processed in other conventional shaping operations such as injection molding and blow-molding. The compositions of the invention which are subsequently reprocessed typically display physical properties (e.g., tensile strength, elongation, compressive strain, and hardness) which are similar to the original values.

In one embodiment, the composition of the invention has a hardness as measured in accordance with DIN EN 53505 (Shore A), which is 5 points lower, preferably 10 points lower, more preferably 15 points lower than that of the pure polyamide (A) used.

The polymer compositions of the invention, particularly in the form of pellets, can be subjected to further thermoplastic processing in a downstream step by extrusion to form a molding, preferably a profile. In this case, according to a preferred procedure, the compositions of the invention in the form of a pelletized material are conveyed continuously into a kneader or extruder in accordance with the prior art, heated and mad plastic in this kneader or extruder by exposure to temperature, and then pressed through a die which dictates the desired profile shape. Here, accordingly, depending on the configuration of the die, either solid profiles or else hollow profiles can be manufactured.

A further subject of the invention are moldings produced by extruding the polymer compositions of the invention.

In one preferred embodiment, the composition of the invention is extruded directly, via an appropriate die, continuously in the form of a profile, which can then—likewise after cooling—be trimmed and/or cut to length.

The polymer compositions obtained are preferably thermoplastic, meaning that the temperature at which the loss factor (G"/G') in accordance with DIN EN ISO 6721-2:2008 has a value of 1 is preferably at least 40° C., more preferably at least 100° C.

The polymer compositions of the invention can be used anywhere polyamides are employed.

The method of the invention has the advantage that polyamide-based thermoplastic elastomers can be produced in a simple way.

The compositions of the invention have the advantage that they can be processed by conventional technologies such as extrusion, vacuumforming, injection molding, blowmolding or compression molding. Moreover, these compositions can be reprocessed (recycled) with little or no diminution in the mechanical properties.

Furthermore, an advantage of the compositions of the invention is that in spite of the low Shore A hardnesses, the silicone fraction means that they have a significantly lower tendency to stick to one another.

It is advantageous here as well that the polymer compositions of the invention exhibit low water absorption and also, generally, a greatly improved abrasion resistance.

The method of the invention has the advantage that the properties of the thermoplastic polymer composition can be adjusted in a targeted manner in such a way that, in particular, flexible materials with a Shore A hardness of below 70 are contained in conjunction with a high tensile strength and elongation at break.

Another advantage of the method of the invention is that it can be employed universally and is very versatile and the polymer compositions can be produced with good yields.

Possible uses of the compositions of the present invention include the production of parts and components for automotive, electronics, electrical, communications, household, and medical applications. For example, the compositions can be used to produce wire and cable insulation; for automotive and household appliance components such as belts, hoses, boots, bellows, seals; for components of gasoline lines and air conduits; for architectural seals, bottle closures, furniture components, soft-feel grips for hand-held implements (e.g., grips for tools), medical devices such as catheters, sports articles, for the coating of textiles such as airbags and membranes, for example, and for rubber parts in general.

Further possible applications are as sealants, additives for polymer processing, such as processing assistants in extrusion of thermoplastics, antifouling coatings, foils and films, coatings additives, an auxiliary for modifying resins or for modifying bitumen, a plastics additive, such as impact tougheners or flame retardants, as packaging material for electronic components, in insulating or shielding materials, in cable cladding, as coating material for wood, paper, and card, coating material for textile fibers or textile fabrics, coating material for natural substances such as leather and furs, for example, material for membranes or a constituent in sports equipment such as sports footwear, for example. Preferred applications of the polymer compositions of the invention are uses as thermoplastic elastomers such as for cable claddings, hoses, seals, keyboard mats, for example, for membranes, such as membranes with gas-permeability, for coating applications, in nonstick coatings, tissue-compatible coatings, flame-retarded coatings, for example, and as biocompatible materials.

The polymer composition of the invention surprisingly exhibit outstanding properties in relation to adhesion and low-temperature elasticity in injection molding applications for the electronics and medical sectors, for example, or in extrusion applications for fibers or technical foils and films.

In the examples described below, all of the viscosity data are based on a temperature of 25° C. Unless otherwise indicated, the examples below are carried out under a pressure of the surrounding atmosphere, in other words approximately 1000 hPa, and at room temperature, in other words at approximately 23° C., and/or at a temperature which comes about when the reactants are combined at room temperature without additional heating or cooling, and also at a relative atmospheric humidity of approximately 50%.

Furthermore, all figures for parts and percentages are based on the weight, unless otherwise indicated.

Products used in the examples are as follows:

TPE-A1: thermoplastic copolyamide (copolymer of nylon 12 and polytetramethylene glycol) having a hardness of 81 Shore A (for properties see Table 2) available commercially under the name PEBAX° 3533 from Arkema SA, Colombes (FR);

TPE-A2: thermoplastic copolyamide (copolymer of nylon 12 and polytetramethylene glycol) having a hardness of 72 Shore A (for properties see Table 2) available commercially under the name PEBAX® 2533 from Arkema SA, Colombes (FR);

Copolymer B1:

In a twin-screw kneader from Collin, Ebersberg (DE), with 6 heating zones, under a nitrogen atmosphere, a diisocyanate (methylenebis(4-isocyanatocyclohexane)) (H12MDI) (available commercially under the name Desmodur W from Covestro AG, Leverkusen (DE)) was metered in the first heating zone and a bisaminopropyl-terminated polydimethylsiloxane having a molecular weight of 11,832 g/mol was metered in the second heating zone. The temperature profile of the heating zones was programmed as follows: zone 1 30° C., zone 2 140° C., zone 3 170° C., zone 4 190° C., zone 5 195° C., zone 6 185° C. The rotary speed was 150 rpm. The diisocyanate (methylenebis(4-isocyanatocyclo-hexane)) (H12MDI) was metered in zone 1 at 607 mg/min (139 mmol/h), and the amine oil component was metered in zone 2 at 27.3 g/min (138.5 mmol/h). At the die of the extruder, a colorless, highly transparent polydimethylsiloxane-polyurea block copolymer was obtained, and was subsequently pelletized. The molecular weight was 146,800 g/mol (number average), and 308,300 g/mol (weight average). The Shore A hardness was 25, the residual isocyanate content 172 ppm. The elongation at break was 425%. The temperature at which the loss factor ($G''/G'$) in accordance with ISO 6721-10 has a value of 1 was in this case 185° C. (measuring frequency 1 Hz, deformation 0.1%).

Copolymer B2:

In a twin-screw kneader from Collin, Ebersberg (DE), with 6 heating zones, under a nitrogen atmosphere, a diisocyanate (methylenebis(4-isocyanatocyclohexane)) (H12MDI) (available commercially under the name Desmodur W from Covestro AG, Leverkusen (DE)) was metered in the first heating zone and a bisaminopropyl-terminated polydimethylsiloxane having a molecular weight of 14,690 g/mol was metered in the second heating zone. The temperature profile of the heating zones was programmed as follows: zone 1 30° C., zone 2 140° C., zone 3 170° C., zone 4 190° C., zone 5 195° C., zone 6 185° C. The rotary speed was 150 rpm. The diisocyanate (methylenebis(4-isocyanatocyclo-hexane)) (H12MDI) was metered in zone 1 at 448 mg/min (102.6 mmol/h), and the amine oil component was metered in zone 2 at 25.0 g/min (102.1 mmol/h). At the die of the extruder, a colorless, highly transparent polydimethylsiloxane-polyurea block copolymer was obtained, and was subsequently pelletized. The molecular weight was 202,400 g/mol (number average), 418,250 g/mol (weight average). The Shore A hardness was 18, the residual isocyanate content 153 ppm. The elongation at break was 525%. The temperature at which the loss factor ($G''/G'$) in accordance with ISO 6721-10 has a value of 1 was in this case 188° C. (measuring frequency 1 Hz, deformation 0.1%).

EXAMPLE 1

1.6 kg of TPE-A 1 were added with 0.40 kg of copolymer B1,each in pellet form, continuously via a hopper, in zone 1 of a counterrotating twin-screw extruder ZK 25 from Collin (Ebersberg (DE)) and compounded. The temperature here was 100° C. in the intake region (zone 1) and was raised to 180° C. in zone 2 and to 195° C. in zone 3. Zone 4 and zone 5 were at 190° C., and the die was heated at 190° C. The rotary speed of the screws was 60 revolutions/minute. The homogeneous melt obtained was extruded as a strand, cooled to 30° C. in a waterbath, and then pelletized by means of a strand pelletizer. This gave 1.85 kg of polymer blend with a copolymer B1 content of 20 wt %.

EXAMPLES 2-6

The procedure described in Example 1 is repeated with the modification that the features set out in Table 1 were selected.

TABLE 1

| Example | 1 | 2 | 3 | 4 | 5 | 6 |
|---|---|---|---|---|---|---|
| TPE-A 1 [kg] | 1.6 | 1.2 | | | 1.6 | 1.2 |
| TPE-A 2 [kg] | | | 1.6 | 1.2 | | |
| Copolymer B1 [kg] | 0.4 | 0.8 | 0.4 | 0.8 | | |
| Copolymer B2 [kg] | | | | | 0.4 | 0.8 |
| Heating zone 1 [° C.] | 100 | 100 | 100 | 100 | 100 | 100 |
| Heating zone 2 [° C.] | 180 | 180 | 180 | 180 | 180 | 180 |
| Heating zone 3 [° C.] | 195 | 195 | 195 | 195 | 195 | 195 |
| Heating zone 4 [° C.] | 190 | 195 | 195 | 195 | 195 | 195 |
| Heating zone 5 [° C.] | 190 | 190 | 190 | 190 | 190 | 190 |
| Heating zone 6 [° C.] | 190 | 190 | 190 | 190 | 190 | 190 |
| Rotary speed [revolution/min] | 60 | 60 | 60 | 60 | 60 | 60 |
| Amount obtained [kg] | 1.80 | 1.95 | 1.85 | 1.85 | 1.90 | 1.90 |

TABLE 2

Determination of the mechanical properties

| Example | Tensile strength [MPa] | Elongation at break [%] | Shore A | TR [N/mm] | Density [g/cm$^3$] | Abrasion [mg] | Color |
|---|---|---|---|---|---|---|---|
| 1 | 13.6 | 897 | 77 | 57.8 | 1.0024 | 10.0 | white |
| 2 | 6.3 | 632 | 68 | 43.1 | 1.0012 | 19.4 | white |
| 3 | 9.8 | 923 | 64 | 38.6 | 1.0020 | 23.2 | white |
| 4 | 5.7 | 814 | 58 | 33.5 | 1.0015 | 32.4 | white |
| 5 | 13.1 | 836 | 75 | 54.0 | 1.0022 | 11.8 | white |
| 6 | 6.8 | 725 | 66 | 42.3 | 1.0015 | 21.0 | white |
| TPE-A 1 | 40.3 | 763 | 81 | 81 | 1.00 | 65 | translucent |
| TPE-A 2 | 34 | 820 | 72 | 69 | 1.00 | 121 | Translucent |
| Copolymer B1 | 1.2 | 425% | 28 | n.d. | 1.00 | n.d. | Transparent |
| Copolymer B2 | 0.5 | 525 | 22 | n.d. | 1.00 | n.d. | Transparent | n.d.: not determined

The mechanical properties were determined on injection molded test specimens after storage of the test twills for 1 week.

The Shore A hardness is determined according to DIN EN 53505.

The tensile strength is determined according to DIN EN 53504-S1.

The elongation at break is determined according to DIN EN 53504-S1.

The 100% modulus is determined according to DIN EN 53504-S1.

The tear resistance (TR) is determined according to ASTM D 624 B.

The abrasion resistance is determined according to DIN 53516 with a load of 10 N and after a distance of 40 m.

The density was determined according to DIN EN ISO 1183.

The invention claimed is:

1. A polymer composition, comprising:

(A) at least one polyamide polymer and (B) at least one siloxane-organic copolymer having 50 to 3000 siloxane units per siloxane segment and at least one organic segment having at least one group selected from ester groups, amide groups, urethane groups, urea groups, and thiourea groups, of the formula (1)

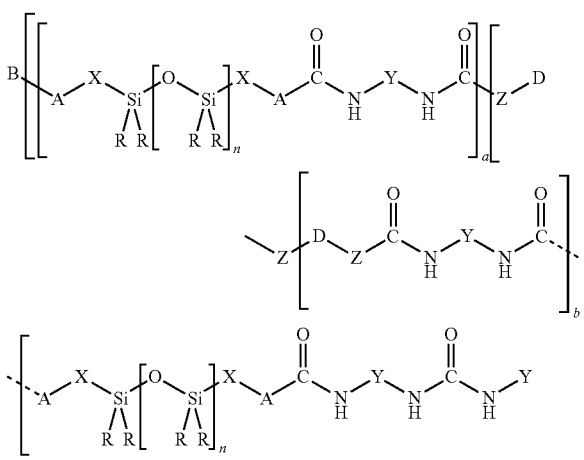

-continued

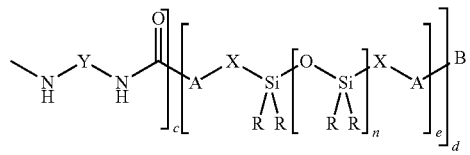

where

R are each identical or different and monovalent, SiC-bonded hydrocarbon radicals having 1 to 20 carbon atoms optionally substituted by fluorine or chlorine, X are each identical or different alkylene radicals which have 1 to 20 carbon atoms and in which methylene units not adjacent to one another are optionally replaced by —O— groups, A are each identical or different and are oxygen, sulfur atom or an amino group —NR'—, 5. A polymer composition, comprising:
(A) at least one polyamide polymer and
(B) at least one siloxane-organic copolymer having 50 to 3000 siloxane units per siloxane segment and at least one organic segment having at least one group selected from ester groups, amide groups, urethane groups, urea groups, and thiourea groups, of the formula (1)

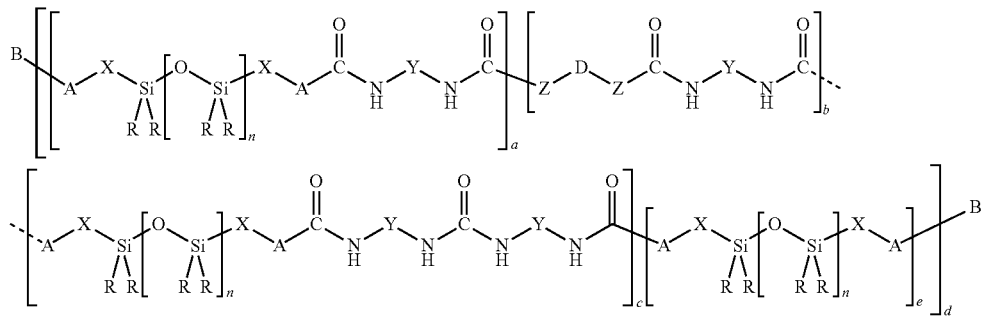

Z are each identical or different and are oxygen or an amino group —NR'—,

R' are each identical or different and are hydrogen or an alkyl radical having 1 to 10 carbon atoms, Y are each identical or different and are a divalent hydrocarbon radicals which have 1 to 20 carbon atoms, optionally substituted by fluorine or chlorine, D are each identical or different and are divalent hydrocarbon radicals which are optionally substituted by fluorine, chlorine or C1-C6 alkyl ester groups and in which methylene units not adjacent to one another are optionally replaced by —O—, COO—, —OCO— or —OCOO— groups, B are each identical or different and are hydrogen or a functional or nonfunctional organic or silicon-organic radical, n each individually is a number from 50 to 2999,
a is a number which is at least 1,
b is 0 or a number from 1 to 100,
c is 0 or a number from 1 to 100,
d is a number which is at least 1, and
e is a number which is 0 or 1, where component (A) comprises at least one copolyamide.

2. The polymer composition of claim 1, wherein the amount of siloxane units in component (B) is between 80 and 99.5 wt%.

3. A method for producing a composition of claim 1, comprising:
in a first step
placing components (A) and (B) and also, optionally, one or more of the components (A') nonpolyamide polymers, (C) organic or inorganic fillers, (D) inorganic fibers, (E) flame retardants, (F) biocides, (G) pigments, (H) UV absorbers, and (I) HALS stabilizers into a reactor, and melting and mixing,
in a second step
discharging the mixture obtained in the first step and cooling the mixture, and in a third step, carried out optionally,
mixing the mixture obtained in the second step with one or more of the components (A') and (C) to (I), and comminuting and/or pelletizing the resultant mixture.

4. A molding produced by extruding a polymer composition of claim 1.

where
R are each identical or different and monovalent, SiC-bonded hydrocarbon radicals having
1 to 20 carbon atoms optionally substituted by fluorine or chlorine,
X are each identical or different alkylene radicals which have 1 to 20 carbon atoms and in which methylene units not adjacent to one another are optionally replaced by —O— groups,
A are each identical or different and are oxygen, sulfur atom or an amino group —NR'—,
Z are each identical or different and are oxygen or an amino group —NR'—,
R' are each identical or different and are hydrogen or an alkyl radical having 1 to 10 carbon atoms,
Y are each identical or different and are a divalent hydrocarbon radicals which have 1 to 20 carbon atoms, optionally substituted by fluorine or chlorine,
D are each identical or different and are divalent hydrocarbon radicals which are optionally substituted by fluorine, chlorine or C1-C6 alkyl ester groups and in which methylene units not adjacent to one another are optionally replaced by —O—, COO—, —OCO— or —OCOO— groups,
B are each identical or different and are hydrogen or a functional or nonfunctional organic or silicon-organic radical,
n each individually is a number from 50 to 2999,
a is a number which is at least 1,
b is 0 or a number from 1 to 100,
c is 0 or a number from 1 to 100,
d is a number which is at least 1, and
e is a number which is 0 or 1, wherein component (A) has elastomeric flexible segments.

6. The polymer composition of claim 5, wherein the amount of siloxane units in component (B) is between 80 and 99.5 wt. %.

7. The polymer composition of claim 5, wherein the weight ratio of the siloxane-organic copolymer (B) to the polyamide polymer (A) is in the range from 5:95 to 80:20.

8. A method for producing a polymer composition comprising:
(A) at least one polyamide polymer and
(B) at least one siloxane-organic copolymer having 50 to 3000 siloxane units per siloxane segment and at least one organic segment having at least one group selected from ester groups, amide groups, urethane groups, urea groups, and thiourea groups, of the formula (1)

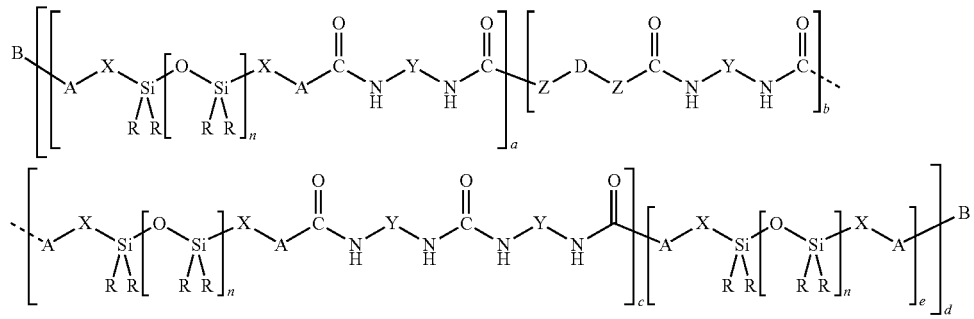

where

R are each identical or different and monovalent, SiC-bonded hydrocarbon radicals having 1 to 20 carbon atoms optionally substituted by fluorine or chlorine, X are each identical or different alkylene radicals which have 1 to 20 carbon atoms and in which methylene units not adjacent to one another are optionally replaced by —O— groups, A are each identical or different and are oxygen, sulfur atom or an amino group —NR'—, Z are each identical or different and are oxygen or an amino group —NR'—, R' are each identical or different and are hydrogen or an alkyl radical having 1 to 10 carbon atoms, Y are each identical or different and are a divalent hydrocarbon radicals which have 1 to 20 carbon atoms, optionally substituted by fluorine or chlorine, D are each identical or different and are divalent hydrocarbon radicals which are optionally substituted by fluorine, chlorine or C1-C6 alkyl ester groups and in which methylene units not adjacent to one another are optionally replaced by —O—, COO—, —OCO— or —OCOO— groups, B are each identical or different and are hydrogen or a functional or nonfunctional organic or silicon-organic radical, n each individually is a number from 50 to 2999,
a is a number which is at least 1,
b is 0 or a number from 1 to 100,
c is 0 or a number from 1 to 100,
d is a number which is at least 1, and
e is a number which is 0 or 1, where component (A) comprises at least one copolyimide, said method comprising:

in a first step
  placing components (A) and (B) and also, optionally, one or more of the components (A') nonpolyamide polymers, (C) organic or inorganic fillers, (D) inorganic fibers, (E) flame retardants, (F) biocides, (G) pigments, (H) UV absorbers, and (I) HALS stabilizers into a reactor, and melting and mixing,
in a second step
  discharging the mixture obtained in the first step and cooling the mixture, and in a third step,
mixing the mixture obtained in the second step with one or more of the components (A') and (C) to (I), and comminuting and/or pelletizing the resultant mixture.

* * * * *